(12) United States Patent
Arbanas et al.

(10) Patent No.: US 6,329,731 B1
(45) Date of Patent: Dec. 11, 2001

(54) DRIVING UNIT INCLUDING A LIQUID COOLED ELECTRIC MOTOR AND A PLANETARY GEAR

(75) Inventors: Viktor Arbanas, Baden; Ernst Zysset, Macolin, both of (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 09/635,664

(22) Filed: Aug. 10, 2000

(30) Foreign Application Priority Data

Aug. 10, 1999 (EP) .................................................. 99115758

(51) Int. Cl.[7] .............................. H02K 7/116; H02K 9/19
(52) U.S. Cl. ................................ 310/52; 310/58; 310/61; 310/75 R; 310/67 R; 417/366; 417/410.3
(58) Field of Search ...................... 310/75 R, 83, 310/52, 58, 61, 63, 67 R; 417/366, 368, 410.3; 418/266; 475/90, 72, 83; 180/65.1, 65.6

(56) References Cited

U.S. PATENT DOCUMENTS

| | | | |
|---|---|---|---|
| 4,578,609 | * 3/1986 | McCarty | 310/156 |
| 5,127,485 | 7/1992 | Wakuta et al. | 180/65.5 |
| 5,718,302 | * 2/1998 | Hasebe et al. | 180/65.6 |
| 6,087,744 | * 7/2000 | Glauning | 310/58 |

FOREIGN PATENT DOCUMENTS

| | | |
|---|---|---|
| 197 32 637 | 2/1999 | (DE) . |
| 0 660 492 | 6/1995 | (EP) . |
| 0 785 612 | 7/1997 | (EP) . |

* cited by examiner

Primary Examiner—Burton S. Mullins
(74) Attorney, Agent, or Firm—Griffin & Szipl, P.C.

(57) ABSTRACT

The invention concerns a driving unit including a liquid cooled electric motor (1) and a planetary gear (3). One of the three main elements of the planetary gear, namely the element used as the reaction element, drives the positive displacement pump of the cooling circuit. Preferably, this element is the ring gear with an inner toothing (23) and said ring gear itself constitutes the pump rotor. The liquid circuit passes into a hollow shaft (11) of the motor rotor and through a radiator (31) incorporated in the common casing (5) containing the motor and the gear. Such a driving unit can be applied to driving a machine or a vehicle.

12 Claims, 4 Drawing Sheets

DRIVING UNIT INCLUDING A LIQUID COOLED ELECTRIC MOTOR AND A PLANETARY GEAR

BACKGROUND OF THE INVENTION

The present invention concerns a driving unit including an electric motor and a planetary gear provided with an input shaft driven by said motor and an output shaft, said unit being provided with a cooling circuit for said motor including a positive displacement pump assuring the flow of a liquid in said circuit, the planetary gear including three main elements, namely: a sun wheel, a planet wheel carrier provided with several planet wheels, and a ring gear having an inner toothing meshed with said planet wheels, one of said three main elements being connected to the input shaft, another element being connected to the output shaft and the third acting as a reaction element.

DESCRIPTION OF THE RELATED ART

The heat generated by the electric motor has to be evacuated to avoid any risk of it overheating. In the prior art, this cooling may be assured by a cooling circuit which passes through the electric motor and wherein a coolant flows as a result of a pump located outside said electric motor. However, a unit of this type is bulky because it requires a mechanical transmission between the motor and the pump, as well as conduits for the liquid between these two elements and a radiator where the liquid is cooled.

For example, U.S. Pat. No. 5,127,485 discloses a driving unit of the type specified in the preamble, in the form of a compact unit driving a single wheel of a vehicle such as a golf cart. The bottom part of the casing which is common to the electric motor and the planetary gear contains oil which is pumped via an oil pump driven by a distinct electric motor, controlled as a function of the temperature of the main motor or the current passing through it, in order to cool the motor by flowing over the coils of its stator and over its rotor after having passed through a cooling radiator incorporated in the casing. Since this cooling system requires an additional motor to drive the pump and a special control unit to control the motor, it can be liable to breakdown and thus does not guarantee sufficient cooling in all circumstances.

SUMMARY OF THE INVENTION

The object of the invention is thus to overcome the drawbacks of the prior art and to cool the electric motor using a particularly simple and compact device.

This object is achieved using a driving unit of the type indicated above, characterised in that the pump is driven by the planetary gear reaction element.

Thus, a mechanical member which is already present in the driving unit is used to drive the pump, which simplifies the construction in all circumstances. Moreover, the pump may advantageously be placed in the same casing as the planetary gear, which avoids using connecting conduits.

Preferably, the reaction element is the ring gear of the planetary gear and this ring gear forms at least part of the rotor of said pump.

Preferably the cooling circuit is provided with at least one adjustable valve, for example a flow limiter valve, controlled by an electronic control unit. It is thus possible to adjust the cooling of the motor automatically, as required by regulating the flow rate of coolant supplied by the pump.

Moreover, it is possible to cool the motor even when the output shaft is at rest. Indeed, in this case, the motor can be rotated by letting the reaction element rotate, which causes the coolant to flow.

Finally, according to a variant of the invention, the pump, the adjustable valve and the electronic control unit form a regulating means acting on the reaction element to regulate the speed and/or torque of the output shaft.

BRIEF DESCRIPTION OF THE DRAWINGS

The invention will be better understood upon reading the following description of a preferred embodiment of the invention, given by way of non limiting illustration with reference to the annexed drawings in which.

DETAILED DESCRIPTION OF THE INVENTION

Figure 1:
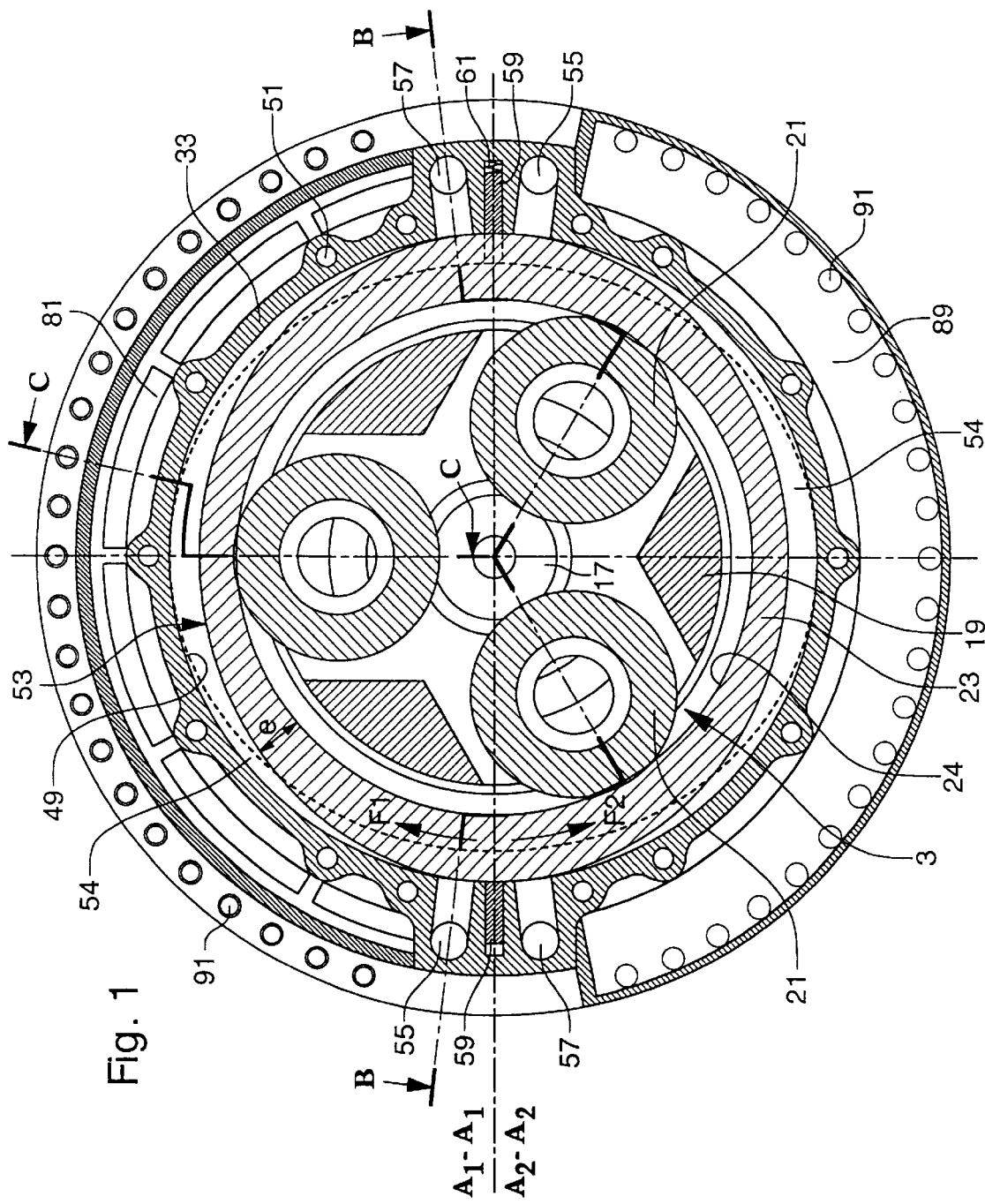
FIG. 1 is a radial cross-section of a driving unit according to the invention, including an electric motor, a planetary gear and a hydraulic circuit passing into these two components, the Figure being formed of two half cross-sections along the line A1—A1 of FIG. 2 and line A2—A2 of FIG. 3.
Figure 2:
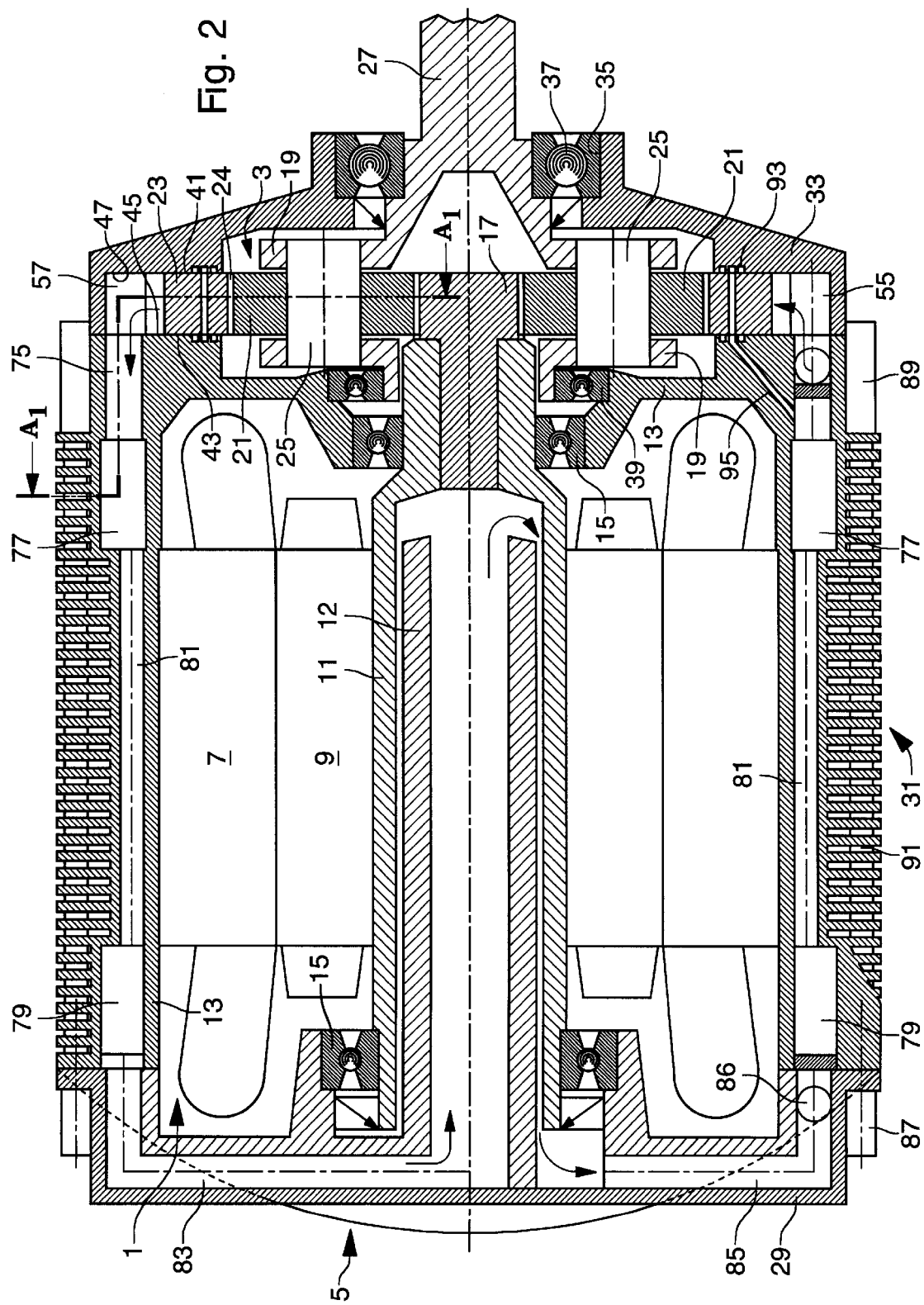
FIG. 2 is a longitudinal cross-section along the line B—B of FIG. 1.
Figure 3:
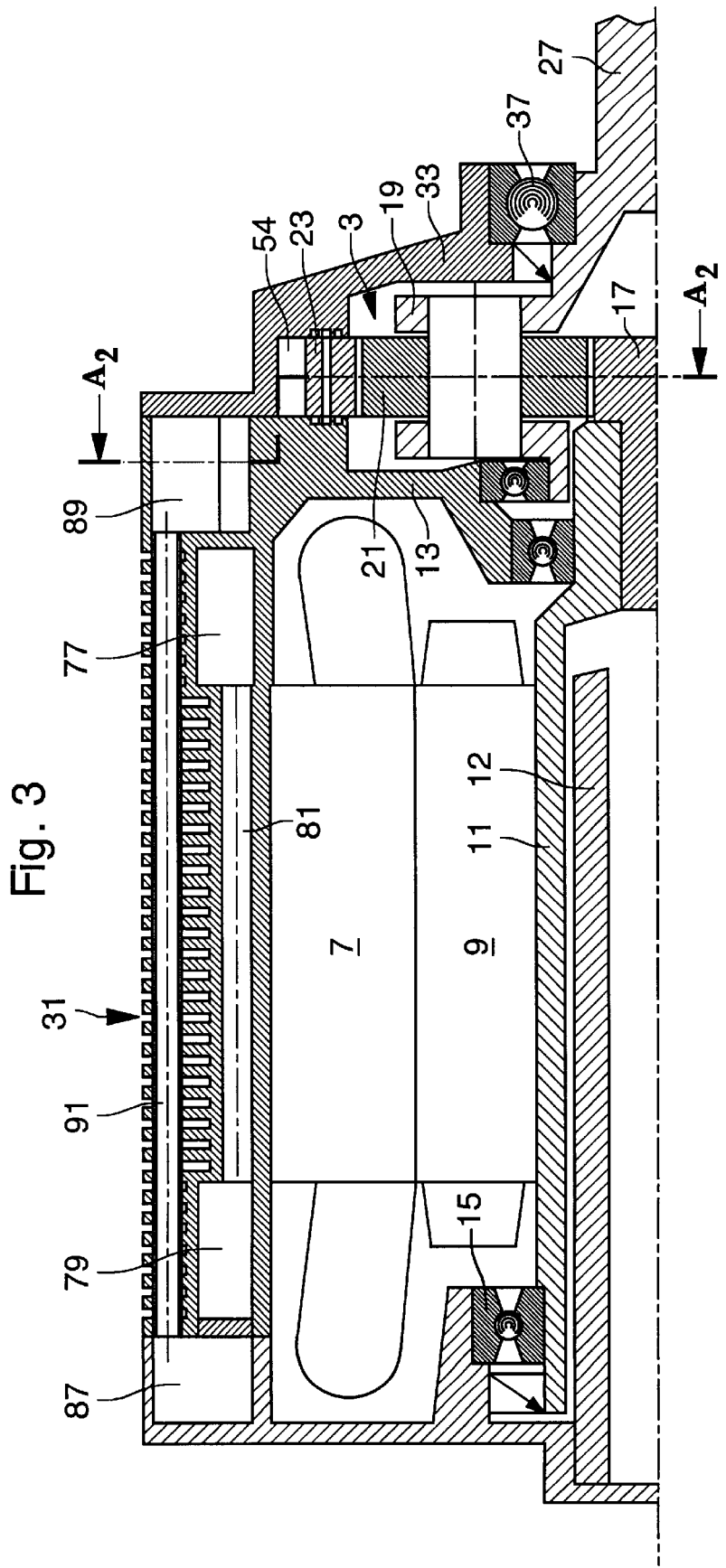
FIG. 3 is a longitudinal cross-section of half of the unit along the line C—C of FIG. 1.

The driving unit shown in FIGS. 1 to 3 includes a motor 1 and a planetary gear 3 in a common casing 5 in two parts. The motor described here is an electric motor, but the invention could also be applied to an internal combustion engine. In a conventional manner, electric motor 1 includes a stator 7 and a rotor 9 provided with a hollow shaft 11. The shaft rotates about a central stationary tube 12. The assembly of these elements is housed in a motor frame 13 on which rotor shaft 11 rests via bearings 15. In the following description this shaft 11 is called the "input shaft".

Also in a conventional manner, planetary gear 3 is formed of a central sun wheel 17, a planet wheel carrier 19 provided with several planet wheels 21 (three as is seen more clearly in FIG. 1) and a ring gear 23 (i.e. an exterior planetary wheel) provided with teeth on its inner surface 24. The planet wheels 21 are mounted on planet wheel carrier 19 via shafts 25 and mesh simultaneously with sun wheel 17 and the toothing of ring gear 23. Planet wheel carrier 19 is extended by a shaft 27 called the "output shaft", intended to rotate a driven element (not shown in the Figures) and which can be an element of a machine or a vehicle wheel, for example.

Electric motor 1, its frame 13 and planetary gear 3 are mounted in cylindrical casing 5, which is made in several parts to allow the different elements to be assembled. More precisely, this casing 5 is formed of a circular bottom 29 which appears on the left of FIG. 2, an annular central portion 31 provided with fins and forming a radiator and a portion 33 opposite bottom 29, which protects more particularly planetary gear 3 and is called hereinafter the transmission casing 33. This transmission casing 33 has a generally conical shape and its portion of smaller diameter defines an opening 35 for the passage of output shaft 27. The end of planet wheel carrier 19 which is connected to output shaft 27 rests on a bearing 37 housed in this opening 35. Moreover, the other end of the planet wheel carrier rests on another bearing 39 which itself rests on frame 13 of the electric motor.

As illustrated in FIG. 2, in addition to its inner toothed face, ring gear 23 has two opposite plane lateral faces, called respectively front lateral face 41 (i.e. the face visible in FIG. 1) and back lateral face 43. Further, in the region located opposite said back lateral face 43, electric motor frame 13 has an annular plane contact surface 45. In a symmetrical manner, in the region located opposite front lateral face 41 of the ring gear, transmission casing 33 has an annular plane contact surface 47. These two contact surfaces 45, 47 contribute to guiding ring gear 23 and are separated from each other by a distance which allows said ring gear to rotate, but guaranteeing good sealing therewith.

With reference now to FIG. 1, it can be seen that transmission casing 33 has a cylindrical inner surface 49 and an outer wall provided with several orifices 51 intended to accommodate screws securing it to motor frame 13. Ring gear 23 has a smooth outer surface 53, opposite to its toothed inner surface 24. While the profile of inner surface 24 is circular, the profile of outer surface 53 is not circular, in this case oval. In other words, the radial thickness $e$ of ring gear 23 is not constant. As a result there are two symmetrical and diametrically opposite chambers 54 between surfaces 49 and 53. These chambers are delimited laterally by aforementioned contact surfaces 45, 47. In a circumferential direction, they are delimited by two stationary segments 59 which slide radially into casing 33 and are pressed against surface 53 of the rotor by springs 61. By sliding against these segments, non circular surface 53 causes the volume of chambers 54 to vary. Thus, according to an important feature of the invention, ring gear 23 and planetary gear casing 33 form a positive displacement pump 60 (FIG. 4), ring gear 23 forming the rotor of said pump. According to a variant which is not shown here, ring gear 23 can constitute only part of the rotor, in the sense that two crescent shaped parts can be fitted onto a conventional ring gear (i.e. a circular ring gear), available on the market, to obtain the final oval or similar shape.

The pump can rotate in both directions, depending on the reaction torque direction. The two chambers 54 are connected respectively to suction and discharge orifices 55 and 57. In FIG. 1, ring gear 23 is supposed to rotate in the direction of arrow F1 and the suction and discharge orifices are as shown. If however, the motor rotates in the other direction (the vehicle reverses), the reaction torque causes ring gear 23 to rotate in the opposite direction (arrow F2), suction orifices 55 then become discharge orifices 57 and vice versa, the coolant being pumped in the other direction.

Finally, it will be noted that ring gear 23 constituting the pump rotor does not need to be centred precisely in the planetary gear casing, since segments 59 pressed against it by springs 61 allow it to have a radial play with respect to surface 49 of casing 33.

The general structure of the driving unit is described with reference to the diagram of FIG. 4, which shows electric motor 1, gear 3 and coolant pump 60, as well as circuit 62 for the coolant which is advantageously water. This circuit begins at the discharge orifices of pump 60 and forms a closed loop to return to the suction orifices of the pump. This circuit is symmetrical and includes a pair of adjustable flow rate limiter valves 63, each located downstream of each discharge orifice. A branch pipe parallel to each valve 63 includes an anti-backflow valve 65. This circuit 62 is symmetrical so as to allow the pump to rotate in both directions. Electronic unit 67 can contain a programme which automatically controls the flow rate of coolant, as well as the pump discharge pressure and thus the reaction torque exerted by the coolant on the planetary gear.

Adjustable valves 63 are automatically controlled by an electric control unit 67 which can receive signals from sensors indicating for example the rotational speeds of input and output shafts 11 and 27, the temperature of motor 1 etc.. The cooling circuit also passes through radiator 31 and electric motor 1 before returning to pump 60 passing through anti-backflow valve 65. Further, the circuit can be connected to a liquid tank or to a hydraulic accumulator 73.

The coolant circuit through the motor will now be described in more detail with reference to FIGS. 1 to 3.

Figure 4:
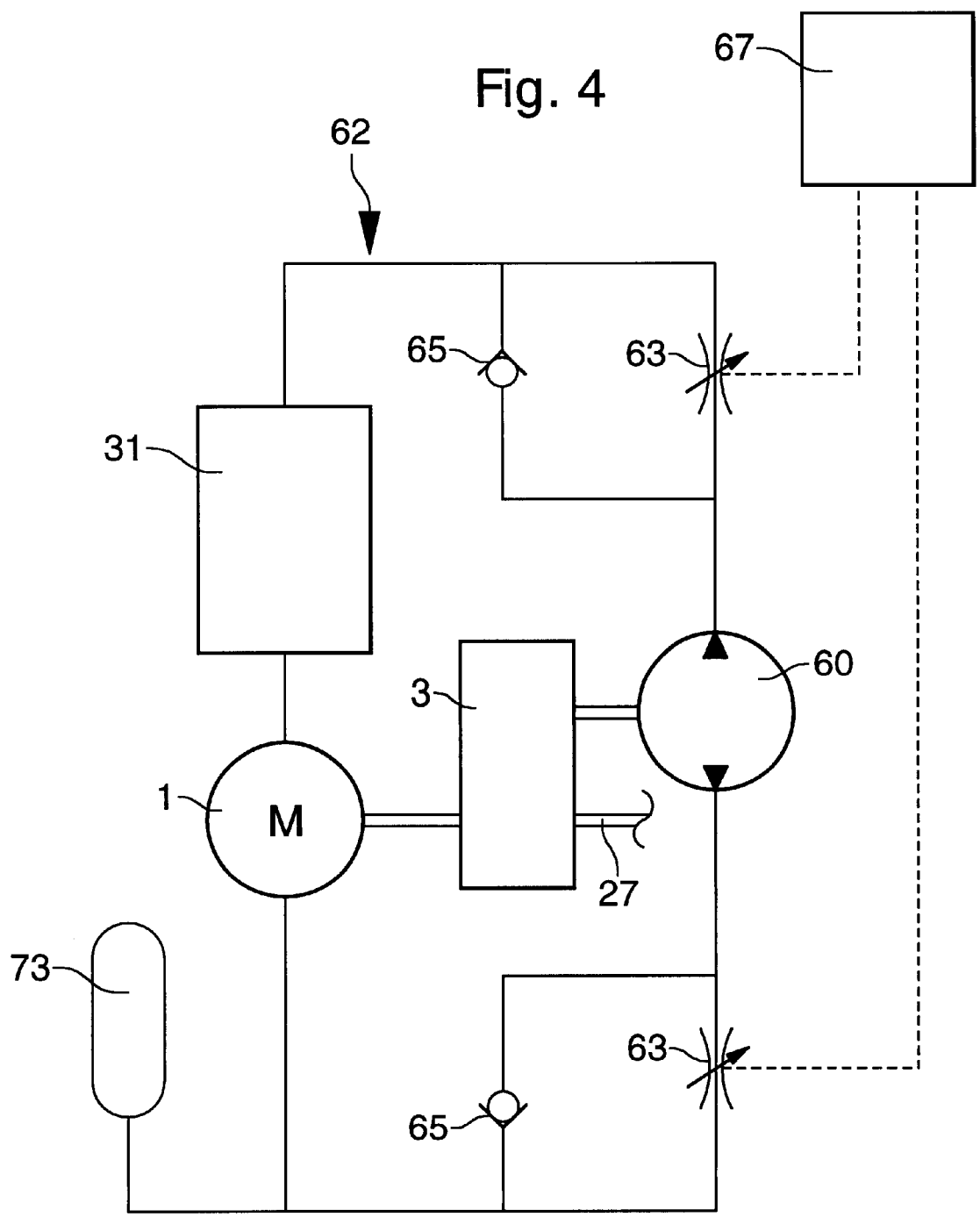
FIG. 4 is a general diagram of the unit according to the invention.

As illustrated in the cross-section of FIG. 2, when the coolant originating from discharge orifice 57 has passed through valve 63 shown in FIG. 4, it penetrates, via a conduit 75, a first annular channel 77 which extends over the entire periphery of the motor, then the coolant passes through a group of cooling conduits 81 of the stator to join a second annular channel 79 similar to channel 77, at the other end of the motor. As illustrated in FIG. 1, cooling conduits 81 are arranged substantially over the entire circumference of the stator. They can have a cross-section of any shape. Then, the coolant leaves second annular channel 79 and penetrates, via a radial conduit 83, central tube 12, where it comes out to pass between tube 12 and the inner surface of the hollow motor shaft, where it takes heat from the rotor. The coolant then passes into another radial conduit 85 and penetrates, via an orifice 86, radiator 31. The radiator includes a collector channel 87 connected to another collector channel 89 via a group of cooling tubes 91 passing through the fins of radiator 31 over the whole of its length. Finally, the coolant leaves collector channel 89 to join suction orifice 55. The two channels 87 and 89 each extend over a little less than half the circumference of the motor, as can be seen in FIG. 1, where it can also be seen that tubes 91 of radiator 31 have a circular cross-section.

It should be noted that radiator 31 could be designed differently in accordance with requirements, for example it could be arranged on one side of the motor only in order to be well exposed to a current of air. This current of air could be generated by a cooling fan and guided by a sheet metal cover covering the radiator.

In FIG. 2 it can be observed that contact surfaces 47, 45 respectively of motor frame 13 and of transmission casing 33 are provided with grooves 93. Moreover, motor frame 13 has a bore 95 connecting grooves 93 to the entry of annular channel 77. Since the coolant is preferably water, grooves 93 allow water leaks, which could otherwise penetrate the planetary gear, to be recovered.

What is claimed is:

1. A driving unit including an electric motor and a planetary gear provided with an input shaft driven by said motor and an output shaft, the driving unit being provided with a cooling circuit for said motor including a positive displacement pump assuring the flow of a liquid in said circuit, said planetary gear including three main elements: a sun wheel, a planet wheel carrier provided with several planet wheels, and a ring gear having an inner toothing meshed with said planet wheels, one of said three main elements being connected to said input shaft, another element being connected to said output shaft and the third acting as a reaction element, wherein said pump is driven by the reaction element of the planetary gear.

2. A driving unit according to claim 1, wherein the reaction element is said ring gear.

3. A driving unit according to claim 2, wherein said ring gear forms at least part of a rotor of said pump.

4. A driving unit according to claim 3, wherein a casing of the planetary gear also forms a casing of said pump.

5. A driving unit according to claim 1, wherein said input shaft is a hollow shaft of a rotor of said electric motor, said cooling circuit passing inside said hollow shaft.

6. A driving unit according to claim 1, wherein said cooling circuit is entirely contained in a common casing containing said motor and said planetary gear.

7. A driving unit according to claim 6, wherein said common casing is provided, on its periphery, with a radiator through which said cooling circuit passes.

8. A driving unit according to claim 1, wherein said motor and said pump are arranged to rotate in both directions.

9. A driving unit according to claim 1, wherein said cooling circuit is provided with at least one adjustable valve controlled by an electronic control unit.

10. A driving unit according to claim 9, wherein said valve is an adjustable flow rate limiter valve.

11. A driving unit according to claim 9, wherein said electronic control unit receives signals from at least one sensor selected from either a rotational speed sensor for said input shaft, a rotational speed sensor for said output shaft or a temperature sensor for said motor.

12. A driving unit according to claim 9, wherein said pump, said adjustable valve and said electronic control unit form a regulating means acting on said reaction element to regulate the speed and/or the torque of said output shaft.

* * * * *